United States Patent
Palma et al.

(10) Patent No.: US 7,948,204 B2
(45) Date of Patent: May 24, 2011

(54) SENSORLESS SPEED DETECTION OF A PM BRUSHLESS MOTOR WITH PHASE TERMINALS SHORTED

(75) Inventors: Marco Palma, Leini' (IT); Christian Locatelli, Broni (IT)

(73) Assignee: International Rectifier Corporation, El Segundo, CA (US)

( * ) Notice: Subject to any disclaimer, the term of this patent is extended or adjusted under 35 U.S.C. 154(b) by 331 days.

(21) Appl. No.: 12/027,666

(22) Filed: Feb. 7, 2008

(65) Prior Publication Data

US 2008/0252244 A1 Oct. 16, 2008

Related U.S. Application Data

(60) Provisional application No. 60/911,592, filed on Apr. 13, 2007.

(51) Int. Cl.
*H02P 23/00* (2006.01)

(52) U.S. Cl. .......................... 318/798; 318/805; 327/108

(58) Field of Classification Search .................. 318/798, 318/801, 805, 807, 812; 327/108, 583, 589
See application file for complete search history.

(56) References Cited

U.S. PATENT DOCUMENTS

| | | | |
|---|---|---|---|
| 5,969,964 A * | 10/1999 | Mangtani ..................... | 363/132 |
| 6,353,345 B1 * | 3/2002 | Yushan et al. ................ | 327/112 |
| 6,891,339 B2 * | 5/2005 | Ribarich et al. .............. | 315/291 |
| 2004/0190317 A1 * | 9/2004 | Cho et al. ..................... | 363/131 |
| 2006/0038547 A1 * | 2/2006 | Ahmad ......................... | 323/284 |

* cited by examiner

*Primary Examiner* — Rina I Duda (74) *Attorney, Agent, or Firm* — Farjami & Farjami LLP (57) ABSTRACT

According to one disclosed embodiment, a gate driver circuit for sensorless speed detection and driving a switching stage includes high side and low side switches series connected across a DC bus and having a switching node between the series switches, the gate driver having a bootstrap power supply for powering a high side driver driving the high side switch of the switching stage and a low side driver power supply, and further includes a comparator circuit to periodically compare the voltage between the bootstrap and low side driver power supplies with a threshold and to output a first signal, wherein the first signal indicates current sign and frequency.

14 Claims, 8 Drawing Sheets

FIG.1A

FIG.1C CURRENT FLOWING TO THE INVERTER

FIG.1B CURRENT FLOWING TO THE MOTOR

ACTUAL INTERNAL BOOTSTRAP ARCHITECTURE

FIG.5

① Vb-Vcc VOLTAGE
② PHASE CURRENT

FIG.6

SENSORLESS SPEED DETECTION OF A PM BRUSHLESS MOTOR WITH PHASE TERMINALS SHORTED

CROSS-REFERENCE TO RELATED APPLICATION

This application is based on and claims priority to U.S. Provisional Patent Application Ser. No. 60/911,592, filed on Apr. 13, 2007 and entitled SENSORLESS SPEED DETECTION OF A PM BRUSHLESS MOTOR WITH PHASE TERMINALS SHORTED, the entire contents of which are incorporated by reference herein.

BACKGROUND OF THE INVENTION

The present invention relates to detection of speed of a Permanent Magnet Brushless Motor while it is rotating and more particularly to speed detection by shorting phase terminals of the motor (Zero Vector). The invention is, for example, applicable to the motor of a washing machine.

SUMMARY OF THE INVENTION

It is an object of the present invention to detect the speed of a Permanent Magnet Brushless Motor while it is rotating by shorting phase terminals of the motor.

According to the invention, the voltage across a switch of a switching stage connected to a phase of the brushless motor is detected during the application of the Zero Vector. From the detected voltage, the direction of the current is determined and, based on transitions from one current direction to the other, the current frequency is determined and thus the motor speed.

In one embodiment, the voltage across the low side switch is determined during application of the Zero Vector 000, all low side switches on, high side off. Thus, the voltage between the switched node $V_S$ and common can be used to determine the motor speed. In another embodiment, the voltage between a bootstrap supply $V_B$ for the high side switch driver and driver voltage supply Vcc can be used to determine the current transitions and thus motor speed.

According to one embodiment, a high voltage gate driver integrated circuit (HVIC) is provided for driving at least one switching stage driving a phase of a brushless motor, the at least one switching stage including high- and low-side switches series connected across a DC bus and having a switching node between the series switches, the HVIC including a bootstrap power supply for providing power to a high side driver of the HVIC, a bootstrap driver connected between a low-side driver power supply and the ground for controlling the bootstrap power supply; a comparator circuit to periodically compare the voltage between the bootstrap power supply and low-side driver power supply with a threshold and to output a signal, wherein the signal indicates the current sign and frequency of the current.

Other features and advantages of the present invention will become apparent from the following description of the invention that refers to the accompanying drawings.

DETAILED DESCRIPTION OF EMBODIMENTS OF THE INVENTION

The present invention discloses detecting the speed of a Permanent Magnet Brushless Motor, while it is rotating, by shorting phase terminals of the motor. This detection is valuable and applicable in applications, for example, washing machines, e.g., during spinning deceleration or in handling failure modes to allow safe stopping of the drum of the washing machine before a door of the machine can be opened.

Figure 1A:
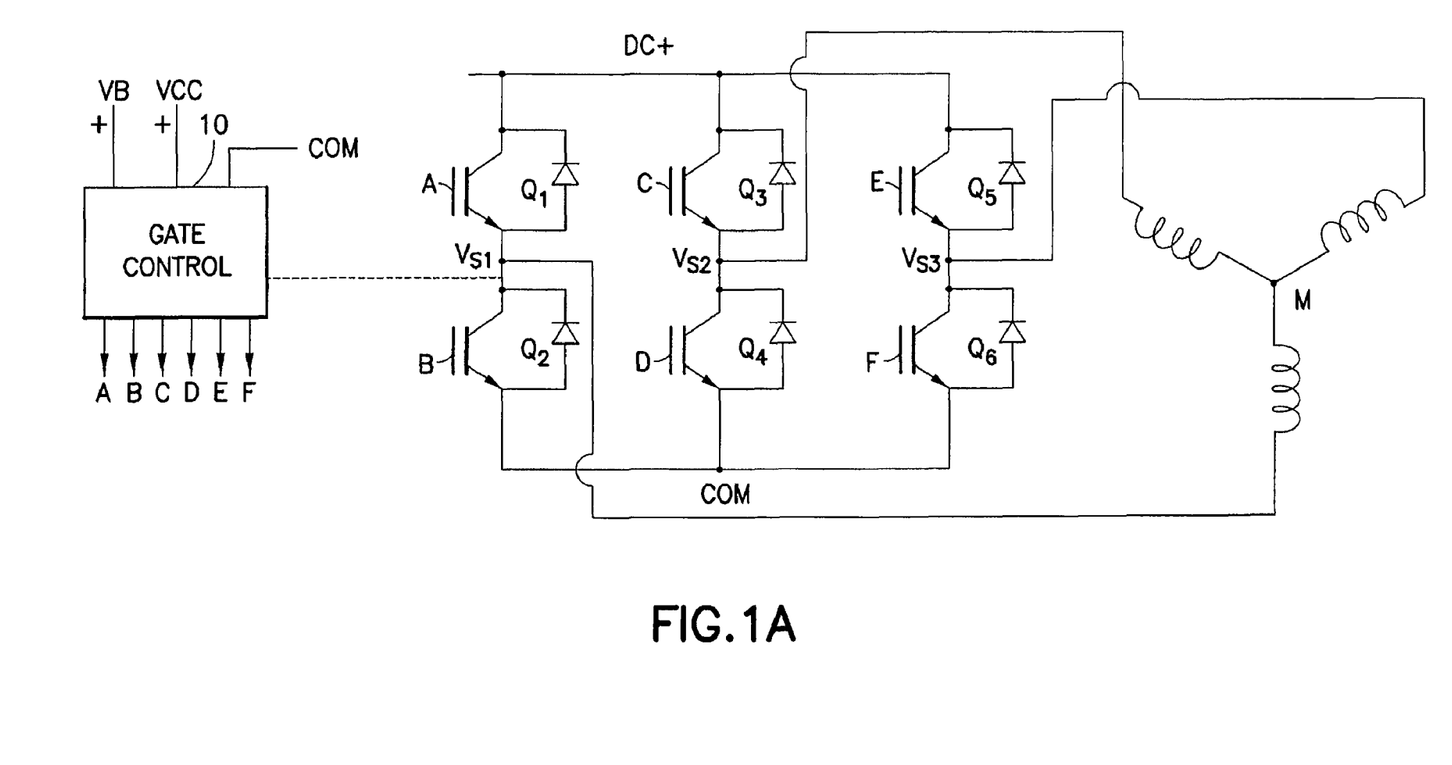
FIG. 1a is a diagram of a basic electronic motor inverter driving a brushless motor, e.g., a brushless DC motor.

In a washing machine using a permanent magnet brushless motor, during deceleration of the drum from a high speed, it may be necessary to determine the speed of the motor. For example, this is necessary to be able to determine when it is acceptable to allow the washing machine door to be opened. The drum of the washing machine is often braked, in part, by applying the Zero Vector to the brushless motor. However, during the Zero Vector, all phases of the motor are shorted together, typically by connecting all the phase terminals to the common line. This would be accomplished by turning all low side switches of the inverter driving the motor on. In FIG. 1a, switches $Q_2$, $Q_4$ and $Q_6$ would be turned on, i.e., the Zero Vector 000, thus shorting all phases of motor M to the common line COM. Alternatively, the Zero Vector 111 would be used with all phase terminals shorted to DC+ line.

This presents a problem, however, in that during the Zero Vector there is no current flowing in the DC bus that could be sensed by a current sense in the DC bus and, because the motor is sensorless, there are no sensors in the motor either. Thus, a way must be developed to determine the drum or motor speed during the application of the Zero Vector by the controller during braking.

FIG. 1a shows the gate driver controller 10 for driving the gates A, B, C, D, E, and F of the inverter switches $Q_1$-$Q_6$. As illustrated in FIG. 1d, the controller 10 includes a low side power supply Vcc for powering the drivers for the low side switches $Q_2$, $Q_4$, and $Q_6$ and a high side floating power supply $V_B$ developed from a bootstrap capacitor $C_B$ connected between the switched node $V_S$ ($V_{S1}$, $V_{S2}$, $V_{S3}$) and the voltage terminal $V_B$, which, as well known, is connected to Vcc through a bootstrap diode $D_B$.

Figure 1B:
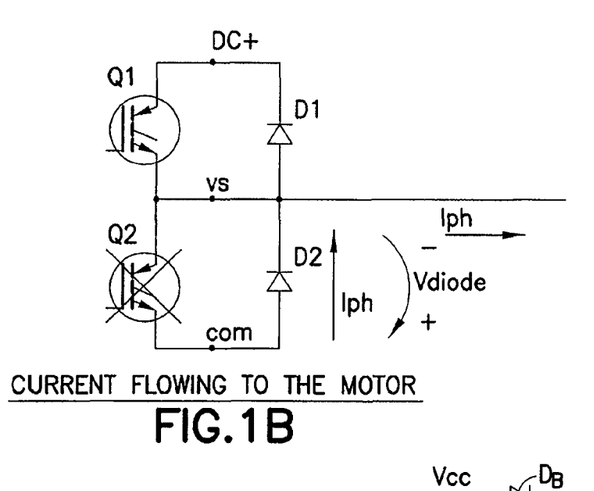
FIGS. 1b and 1c are diagrams of one switching stage of the inverter of FIG. 1a having an inactive high-side and active low-side.
Figure 1C:
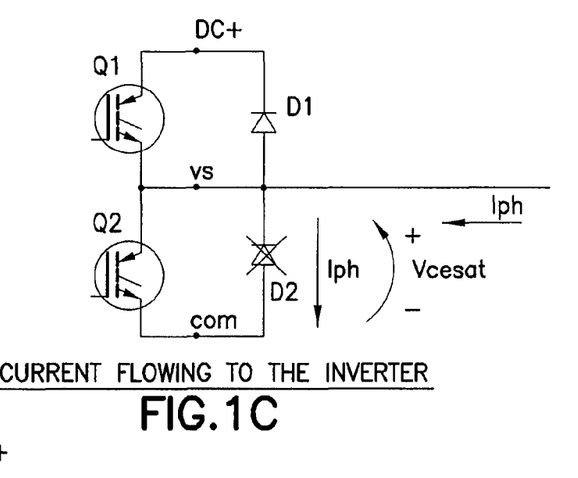
Figure 1D:
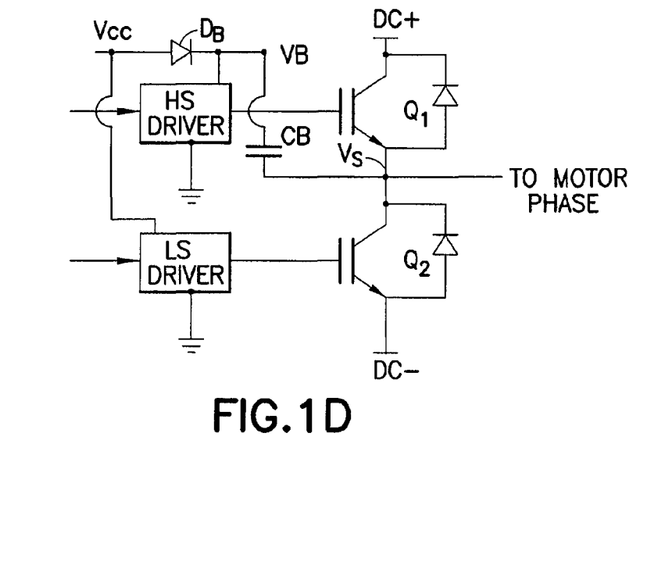
FIG. 1d is a diagram of a controller having a low side power supply and a high side floating power supply developed from a bootstrap capacitor connected between the switched node of the switching stage and a voltage terminal connected through a bootstrap diode.

FIGS. 1b and 1c illustrate one switching stage of the inverter of FIG. 1a having high- and low-side switches $Q_1$ and $Q_2$ series connected at a switching node Vs. The high-side switch $Q_1$ is parallel connected to a high-side diode $D_1$ and the low-side switch $Q_2$ is parallel connected to a low-side diode $D_2$. The high-side switch $Q_1$ and the cathode of the diode $D_1$ are connected to the DC+ voltage source and the low-side switch $Q_2$ and the anode of the diode $D_2$ are connected to the common COM. The anode of the diode $D_1$ and the cathode of the diode $D_2$ are connected at the node Vs. As well known, the switches $Q_1$ and $Q_2$ (together with switches $Q_3$, $Q_4$, $Q_5$, and $Q_6$) are controlled by the controller 10 of FIG. 1a to control the motor speed.

When the high side switch $Q_1$ is turned OFF and the low-side switch $Q_2$ is turned ON, voltages across the low-side switch $Q_2$ and diode $D_2$ depend on the sign of the phase current. During the Zero Vector 000, all low side switches are turned ON. However, depending on the sign or direction of the phase current, the current will flow on either the switch or the diode.

In FIG. 1b, when the phase current is flowing to the motor phase, the current flows through the diode, even though the switch is active (turned on). Thus, the switch $Q_2$ is shown crossed out. In FIG. 1c, when the phase current is flowing back to the inverter from the motor phase, the current flows instead through the switch. Thus, in FIG. 1c, the diode $D_2$ is shown crossed out. In each case, the developed voltage is different. When the current flows to the motor, voltage Vdiode is developed, polarized as shown in FIG. 1b. When the current flows to the inverter, voltage $V_{cesat}$ across the switch is developed as shown in FIG. 1b. According to the invention, these voltages can be used to determine the direction of the current and its frequency, and thus the motor speed during the Zero Vector.

Figure 2:
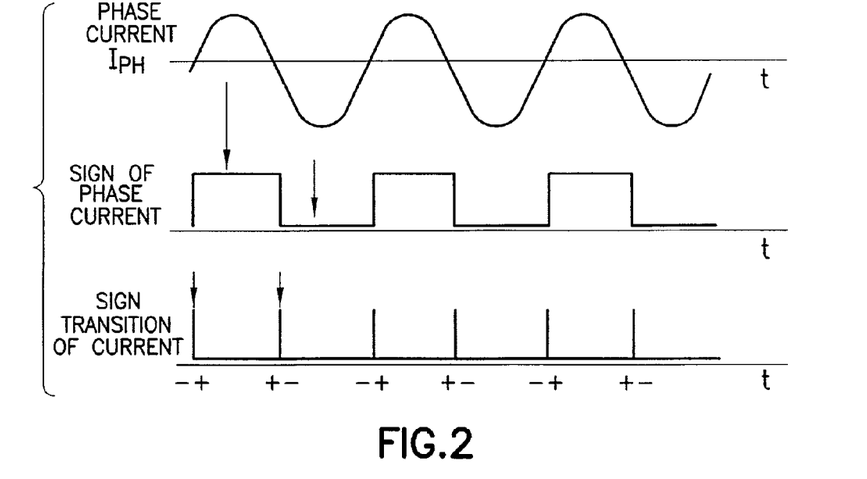
FIG. 2 is a graph of a phase current sign transitions over time at a switching node of the switching stage of FIGS. 1b and 1c.

FIG. 2 is a graph of the phase current $I_{ph}$ over time. The sign of the phase current is positive when the phase current is in the positive area and negative when the wave of the phase current is in the negative area of the graph. Also, the sign transition occurs when the wave of the phase current crosses from the positive to the negative area and vice-versa. Therefore, by sensing voltage between the switching node Vs and the common connection COM it is possible to detect the current sign and the frequency.

The approximate relationship between the switching frequency of the phase current $I_{ph}$, measured in Hz, and the resulting speed of a drum, for example of a washing machine, measured in revolutions per minute (RPM), is:

speed=(frequency*60)/(belt ratio*number of pole pairs) or $s=f*60/(br*pp)$

Figure 3:
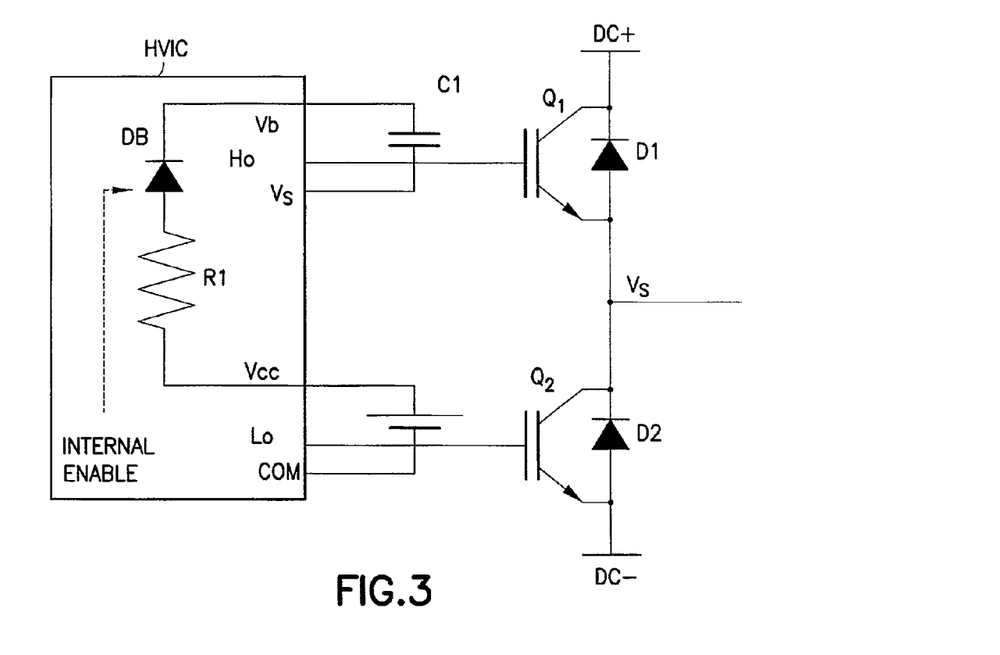
FIG. 3 is a diagram of a high voltage gate driver integrated circuit (HVIC) connected to gate terminals of the high- and low-side switches for driving the switching stage of FIG. 1.

The current sign and frequency can also be detected in other related ways. FIG. 3 illustrates a high voltage gate driver integrated circuit (HVIC) connected to gate terminals of the switches $Q_1$ and $Q_2$ for driving the switching stage. In an HVIC having bootstrap architecture as previously described, high side driver floating positive power supply pin $V_b$ and low side positive power supply pin Vcc are connected either with an external diode or, as illustrated, with a bootstrap internal diode structure diode $D_B$ series coupled to a resistor R1. In such HVIC, the voltage between pins Vb and Vcc can be used to detect the current sign and frequency.

Figure 4A:
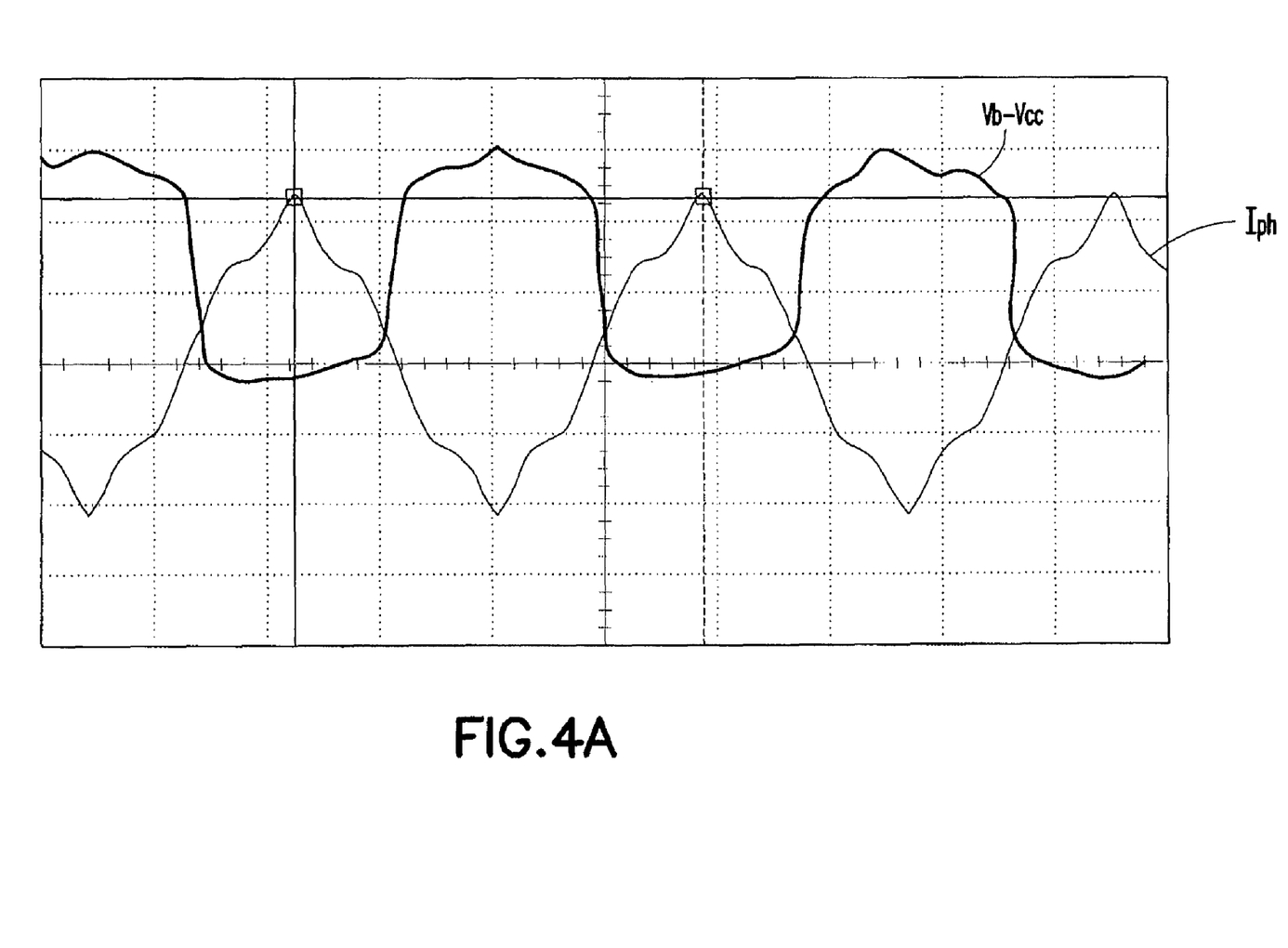
FIGS. 4a-4d are graphs of the high- and low-side positive power supply Vb-Vcc voltage and of the phase current in actual washing machine applications, where the gate driver uses a bootstrap network made of external boot diodes
Figure 4B:
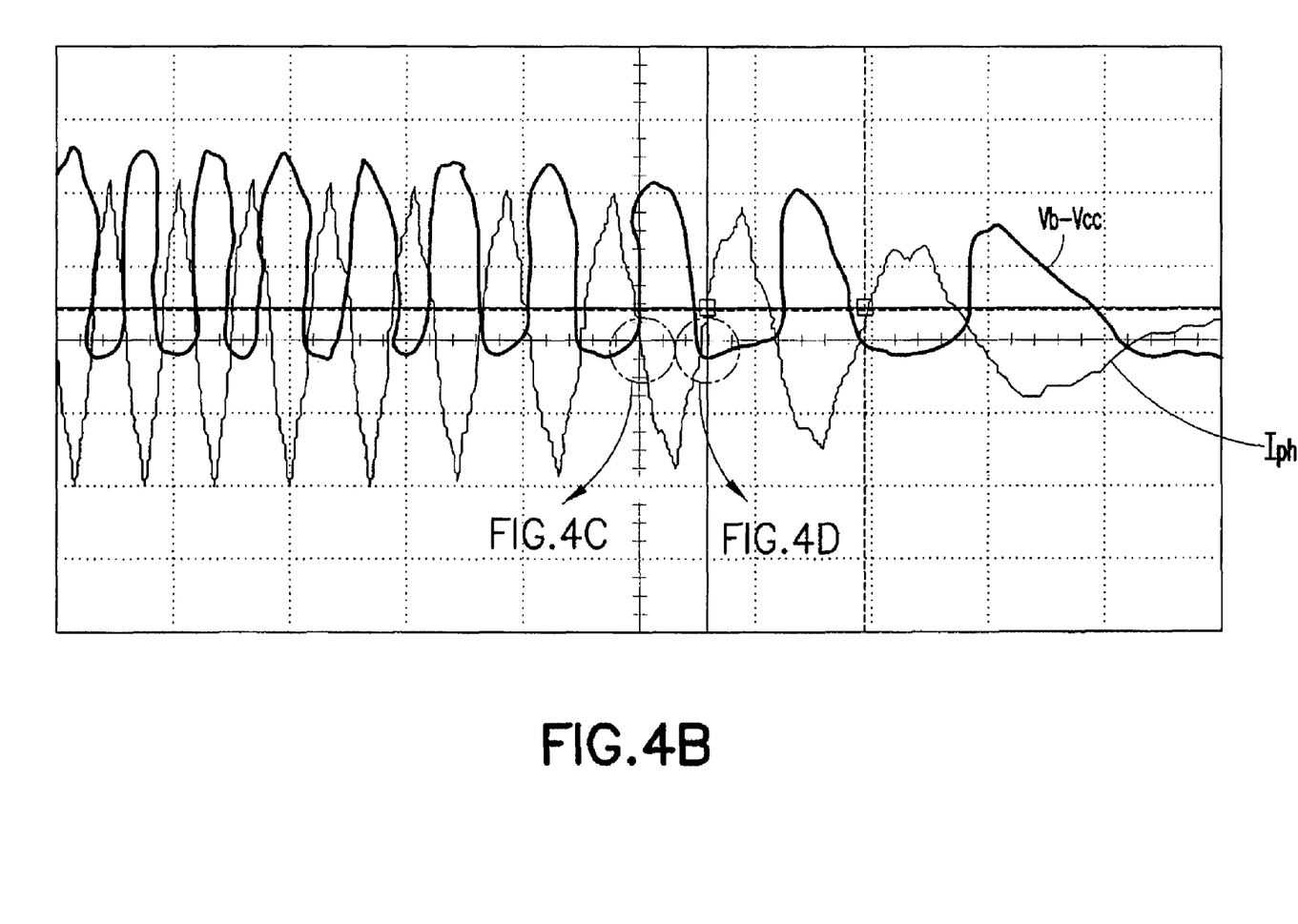
Figure 4C:
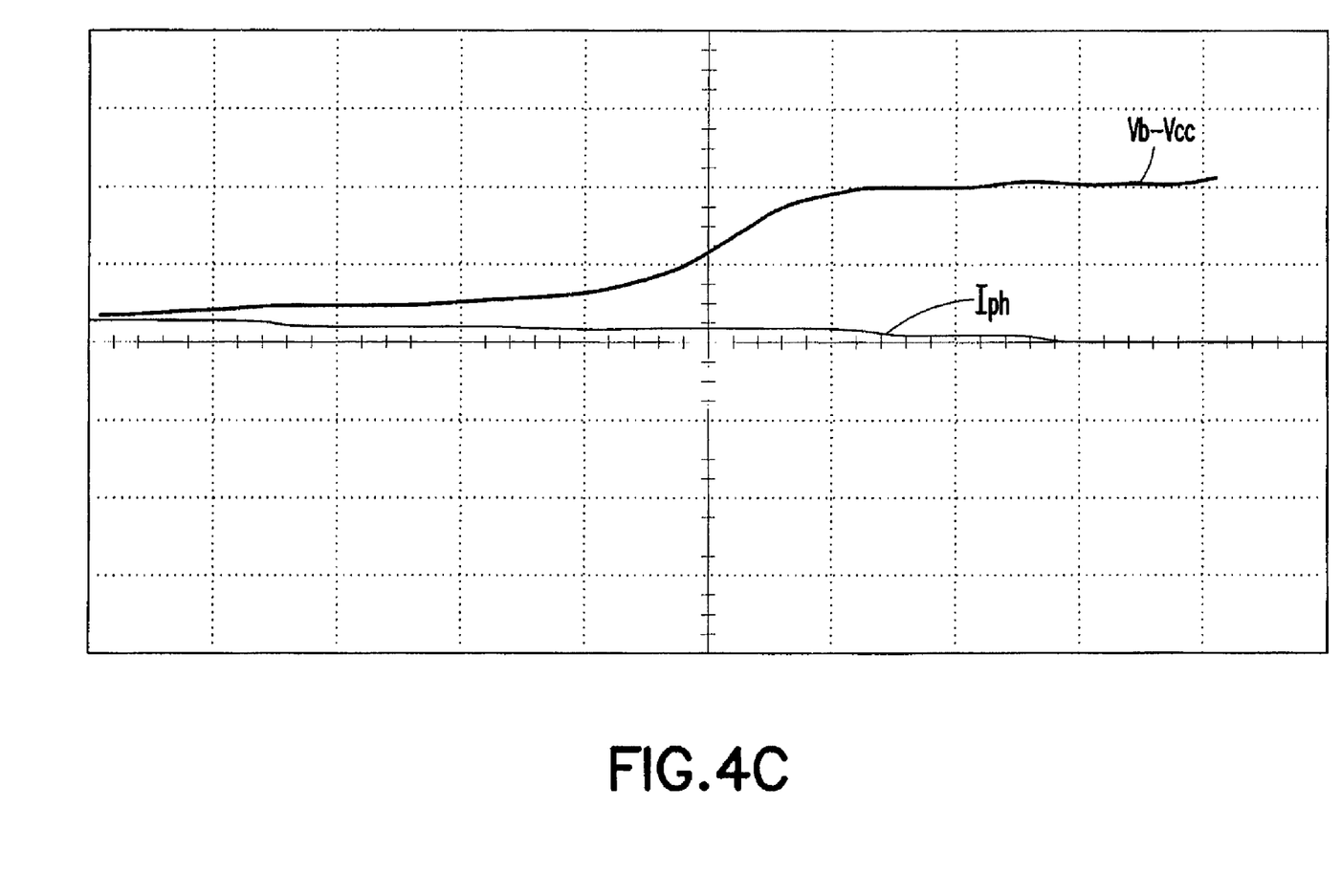
Figure 4D:
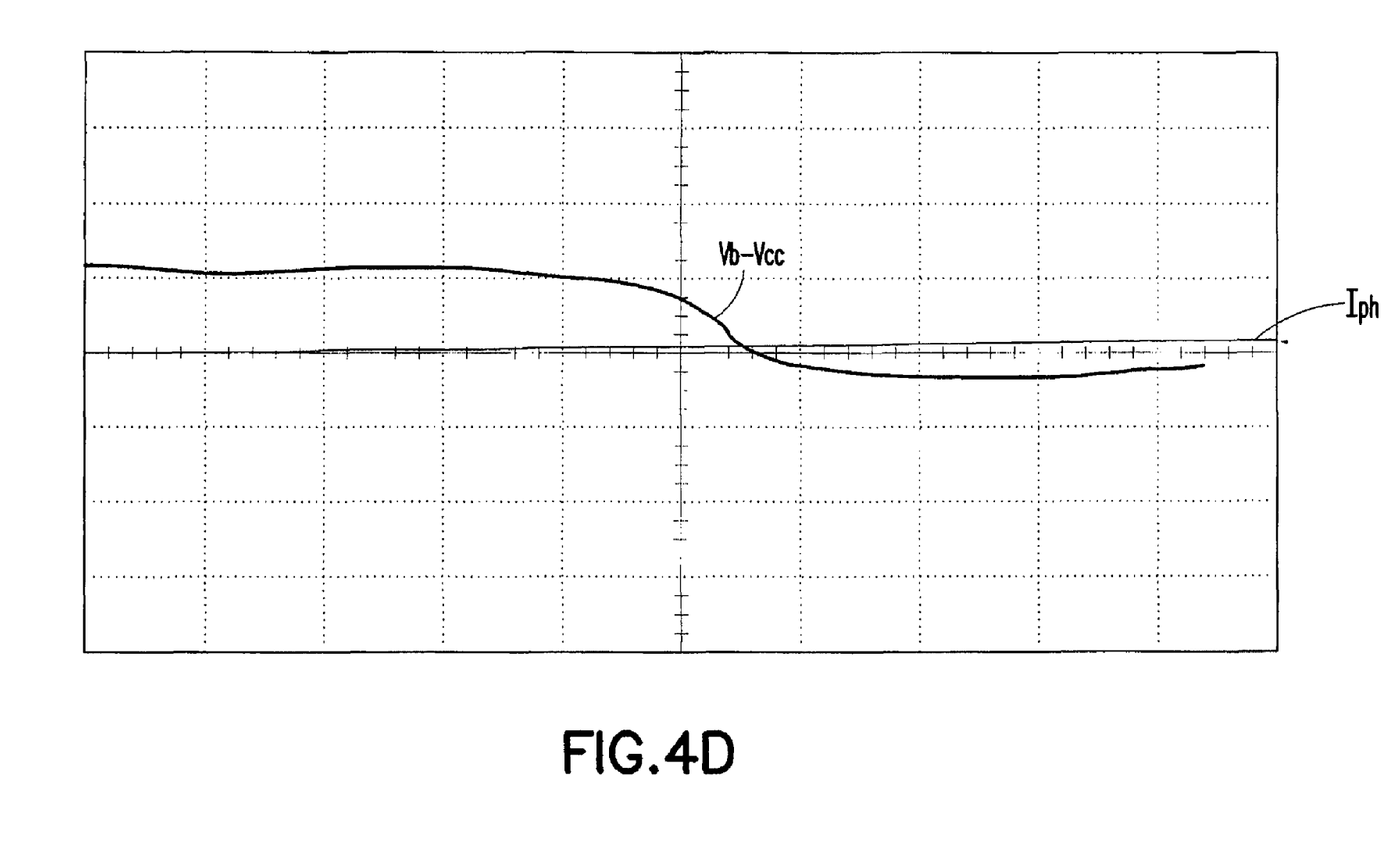

FIGS. 4a-4d illustrates graphs of the Vb-Vcc voltage and of the phase current in actual washer applications. FIG. 4a shows, the motor is braking the drum in Zero Vector (000) configuration while all the low side switches are on. The gate driver in this example uses a bootstrap network made of external bootstrap diodes. The drum speed is 275 rpm (frequency=136.82 Hz; a number of pole pairs=2; belt ratio=14.9). FIG. 4b illustrate a final stage of deceleration, as the drum is near stop. Here the drum speed is below 29 rpm and the Vb-Vcc voltage is still visible. FIGS. 4c and 4d show blow ups of areas identified by circles in FIG. 4b.

Figure 5:
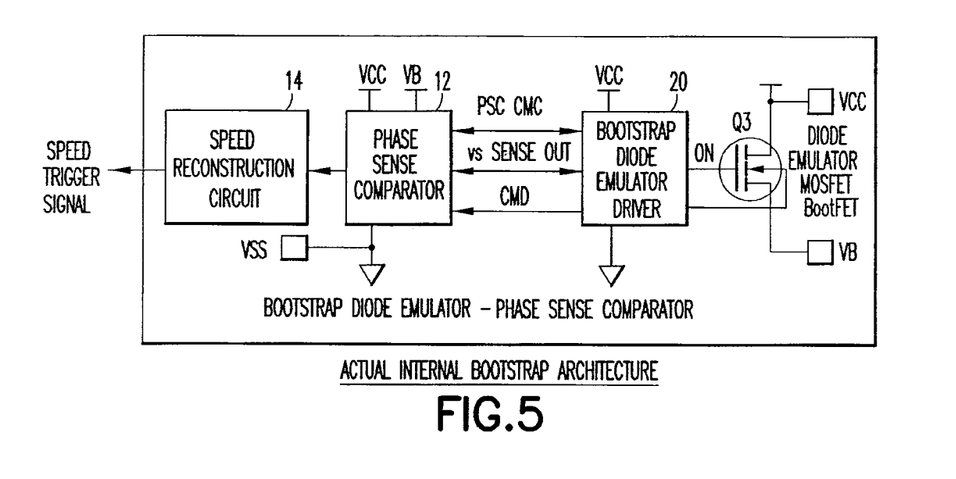
FIG. 5 is a block diagram of an internal bootstrap architecture of the HVIC of FIG. 3 that includes a circuit to periodically compare the voltage between high- and low-side positive voltage pins with a given threshold.

FIG. 5 illustrates an internal bootstrap architecture of an HVIC that includes a circuit to periodically compare the voltage between pins Vb and Vcc with a given threshold voltage and to output the comparator state. The circuit includes a diode emulator switch Q3, e.g., a MOSFET Boot-FET, that is controlled by a bootstrap diode emulation driver 20 connected between the power source voltage Vcc and logic ground $V_{SS}$. The driver 10 is connected to communicate with a phase sense comparator 12 that is connected to the high and low side driver power supply voltages Vb and Vcc, and logic ground $V_{SS}$. The phase sense comparator 12 provides a VS sense output to the bootstrap diode emulation driver 10 and to a speed reconstruction circuit 14 that produces a speed trigger signal. The phase sense comparator 12 trigger signal determines a phase period (see FIG. 6) that is used to determine the motor speed.

Figure 6:
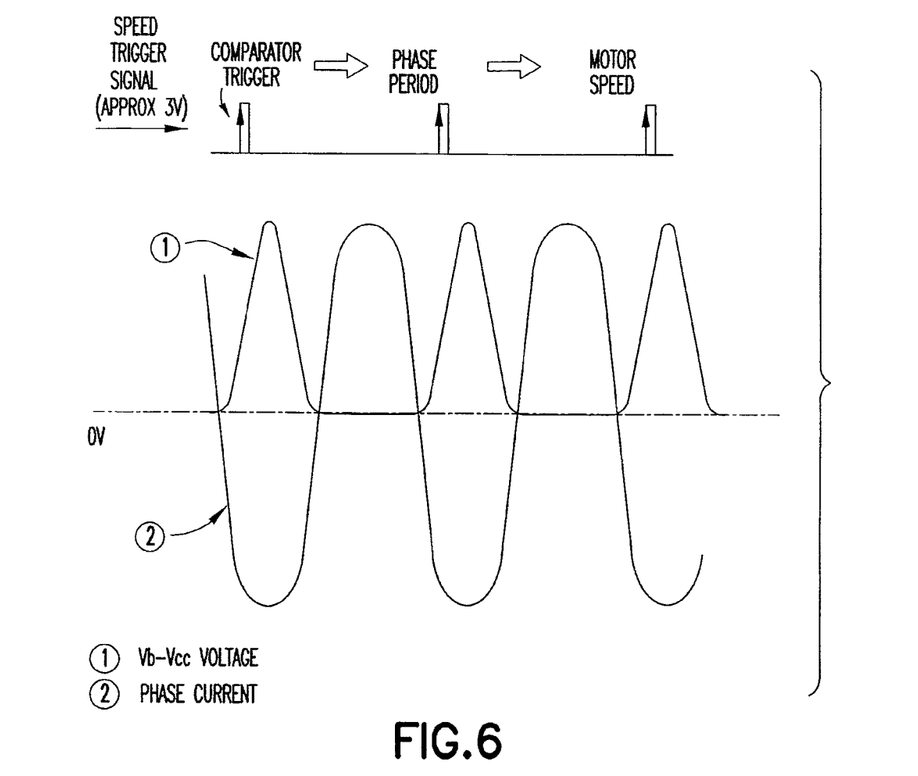
FIG. 6 is a graph of the speed trigger signal generated by the HVIC of FIG. 5.

FIG. 6 illustrates the speed trigger signal, shown at the top, the voltage between pins Vb and Vcc, identified by the numeral 1, and the phase current $I_{PH}$, identified by the numeral 2, generated by the HVIC of FIG. 5.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A gate driver circuit for driving a switching stage including high side and low side switches series connected across a DC bus and having a switching node between the series switches, the gate driver having a bootstrap power supply for powering a high side driver driving the high side switch of the switching stage and a low side driver power supply, and further comprising:
    a comparator circuit to periodically compare the voltage between the bootstrap and low side driver power supplies with a threshold and to output a first signal,
    wherein the first signal indicates current sign and frequency.

2. The gate drive circuit of claim 1, wherein the bootstrap power supply comprises a diode.

3. The gate drive circuit of claim 2, wherein the diode is external.

4. The gate drive circuit of claim 1, wherein the bootstrap power supply comprises a diode emulator switch; and
    an emulator driver connected between the low side driver power supply and a circuit common for controlling the diode emulator switch.

5. The gate drive circuit of claim 1, further comprising a speed reconstruction circuit for providing a speed trigger signal as said first signal, said speed trigger signal having a phase period from which the motor speed can be determined.

6. The gate drive circuit of claim 4, wherein the diode emulator switch is a MOSFET.

7. The gate drive circuit of claim 1, wherein a sign transition of a phase current at the switching node occurs when the wave of the phase current crosses from the positive to the negative area and vice-versa.

8. A gate driver for driving a switching stage, the gate driver having a gate driver power supply for powering a high side driver driving a high side switch of the switching stage, and further comprising:
    a comparator circuit to periodically compare a voltage difference between a gate driver power supply voltage and a low side driver power supply voltage with a threshold voltage and to output a first signal indicating current sign and frequency.

9. The gate drive of claim 8, wherein the gate driver power supply is a bootstrap power supply.

10. The gate drive of claim 9, wherein the bootstrap power supply comprises a diode.

11. The gate drive of claim 9, wherein the bootstrap power supply comprises an external diode.

12. The gate drive of claim 9, wherein the bootstrap power supply comprises a diode emulator switch; and an emulator driver connected between the low side driver power supply and a circuit common for controlling the diode emulator switch.

13. The gate drive of claim 12, wherein the diode emulator switch is a MOSFET.

14. The gate drive of claim 8, further comprising a speed reconstruction circuit for providing a speed trigger signal as said first signal, from which the motor speed can be determined.

* * * * *